United States Patent
Miyahara et al.

(10) Patent No.: US 8,115,836 B2
(45) Date of Patent: Feb. 14, 2012

(54) IMAGE REPRODUCING APPARATUS

(75) Inventors: Seiji Miyahara, Kanagawa (JP); Hisao Shirasawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1395 days.

(21) Appl. No.: 11/359,385

(22) Filed: Feb. 23, 2006

(65) Prior Publication Data

US 2006/0192878 A1    Aug. 31, 2006

(30) Foreign Application Priority Data

Feb. 25, 2005    (JP) ................ 2005-051232

(51) Int. Cl.
     *H04N 5/202*    (2006.01)
(52) U.S. Cl. ........ 348/254; 348/627; 348/671; 348/672; 348/673; 348/674; 348/675
(58) Field of Classification Search ................. None
See application file for complete search history.

(56) References Cited

U.S. PATENT DOCUMENTS

| | | | | |
|---|---|---|---|---|
| 5,012,333 A | * | 4/1991 | Lee et al. | 358/520 |
| 5,835,237 A | * | 11/1998 | Ebrahimi | 358/448 |
| 6,084,939 A | * | 7/2000 | Tamura | 378/98.2 |
| 6,266,102 B1 | * | 7/2001 | Azuma et al. | 348/671 |
| 7,612,804 B1 | * | 11/2009 | Marcu et al. | 348/222.1 |
| 2003/0058465 A1 | | 3/2003 | Miyagi et al. | |
| 2003/0095287 A1 | | 5/2003 | Miyagi et al. | |
| 2004/0114815 A1 | | 6/2004 | Shibaki et al. | |
| 2004/0165081 A1 | | 8/2004 | Shibaki et al. | |
| 2004/0165747 A1 | | 8/2004 | Shibaki et al. | |
| 2004/0252316 A1 | | 12/2004 | Miyagi et al. | |
| 2004/0257622 A1 | | 12/2004 | Shibaki et al. | |
| 2005/0018258 A1 | | 1/2005 | Miyagi et al. | |
| 2005/0018903 A1 | | 1/2005 | Miyagi et al. | |
| 2005/0174590 A1 | * | 8/2005 | Kubo | 358/1.9 |
| 2005/0207661 A1 | | 9/2005 | Miyagi et al. | |

FOREIGN PATENT DOCUMENTS

| | | |
|---|---|---|
| JP | 11-317930 | 11/1999 |
| JP | 2002-305684 | 10/2002 |
| JP | 2003-116047 | 4/2003 |
| JP | 2003-125251 | 4/2003 |
| JP | 2004-305760 | 11/2004 |

OTHER PUBLICATIONS

Garrett M. Johnson, et al., "Rendering HDR Images", IS&T/SID Eleventh Color Imaging Conference, pp. 36-41.

* cited by examiner

*Primary Examiner* — Jason Chan
*Assistant Examiner* — Yih-Sien Kao
(74) *Attorney, Agent, or Firm* — Oblon, Spivak, McClelland, Maier & Neustadt, L.L.P.

(57) ABSTRACT

An image reproducing apparatus is operative in accordance with multiple display modes. The image reproducing apparatus includes a data reproducing unit that reproduces an image on a display based on high dynamic range image data acquired from an object and stored in memory, and a dynamic range control unit that controls the dynamic range of the image to be reproduced on the display using one of different types of dynamic range control schemes in accordance with one of the display modes.

11 Claims, 14 Drawing Sheets

FIG.6A
FIG.6B
FIG.6C
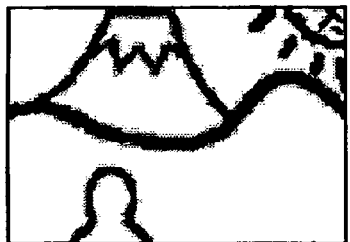
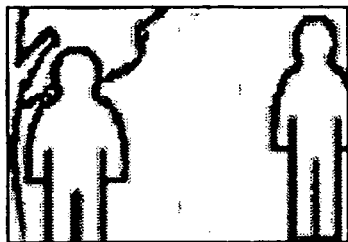
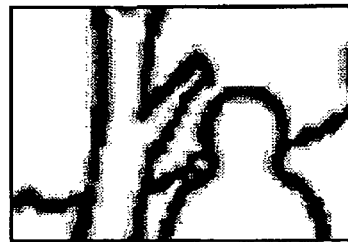
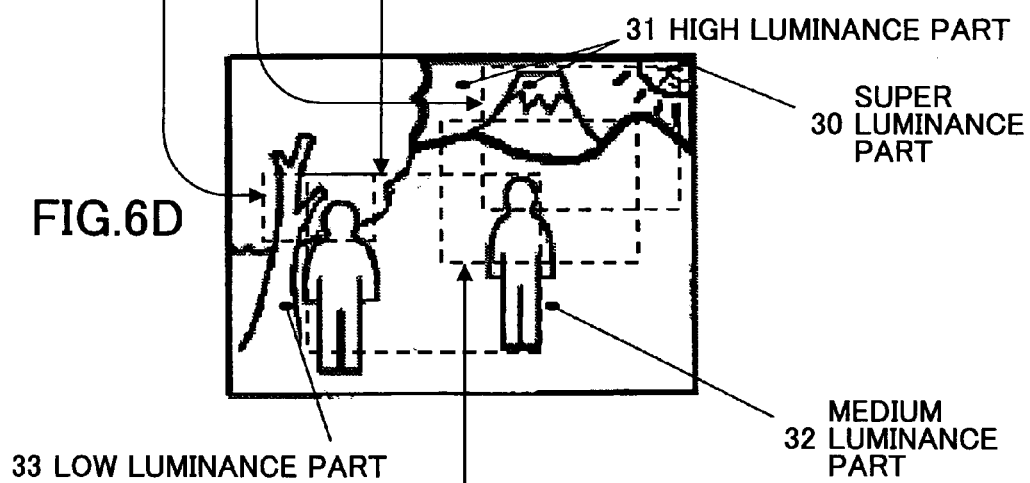
FIG.6D
31 HIGH LUMINANCE PART
SUPER 30 LUMINANCE PART
MEDIUM 32 LUMINANCE PART
33 LOW LUMINANCE PART
FIG.6E
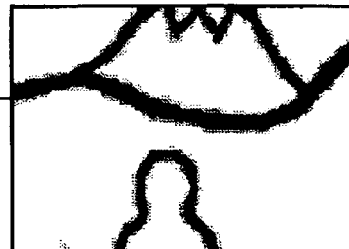

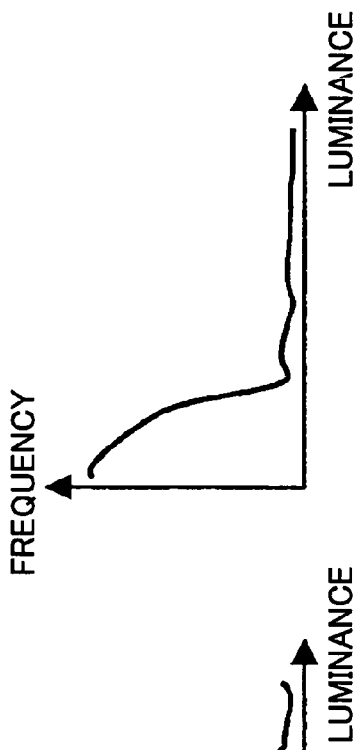
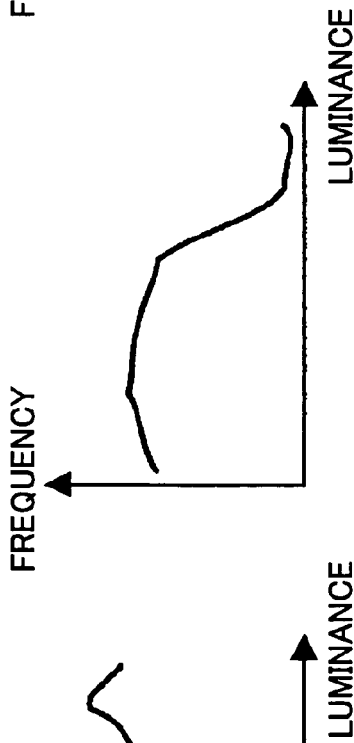
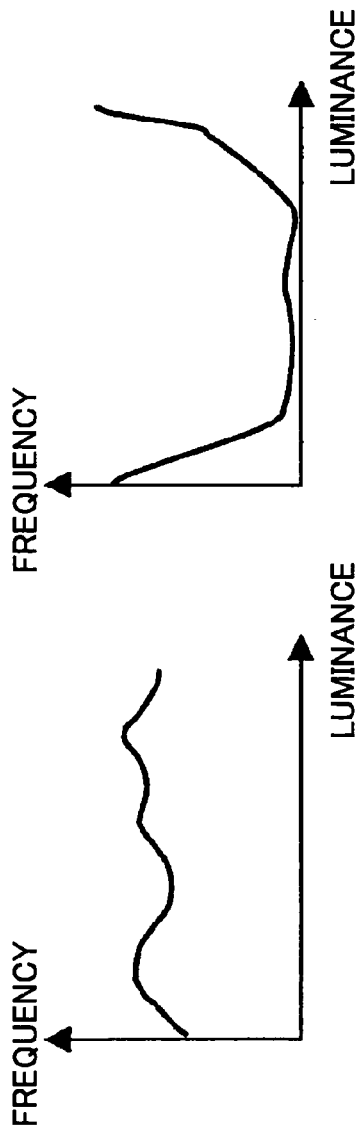
FIG.7A  FIG.7B  FIG.7C  FIG.7D  FIG.7E

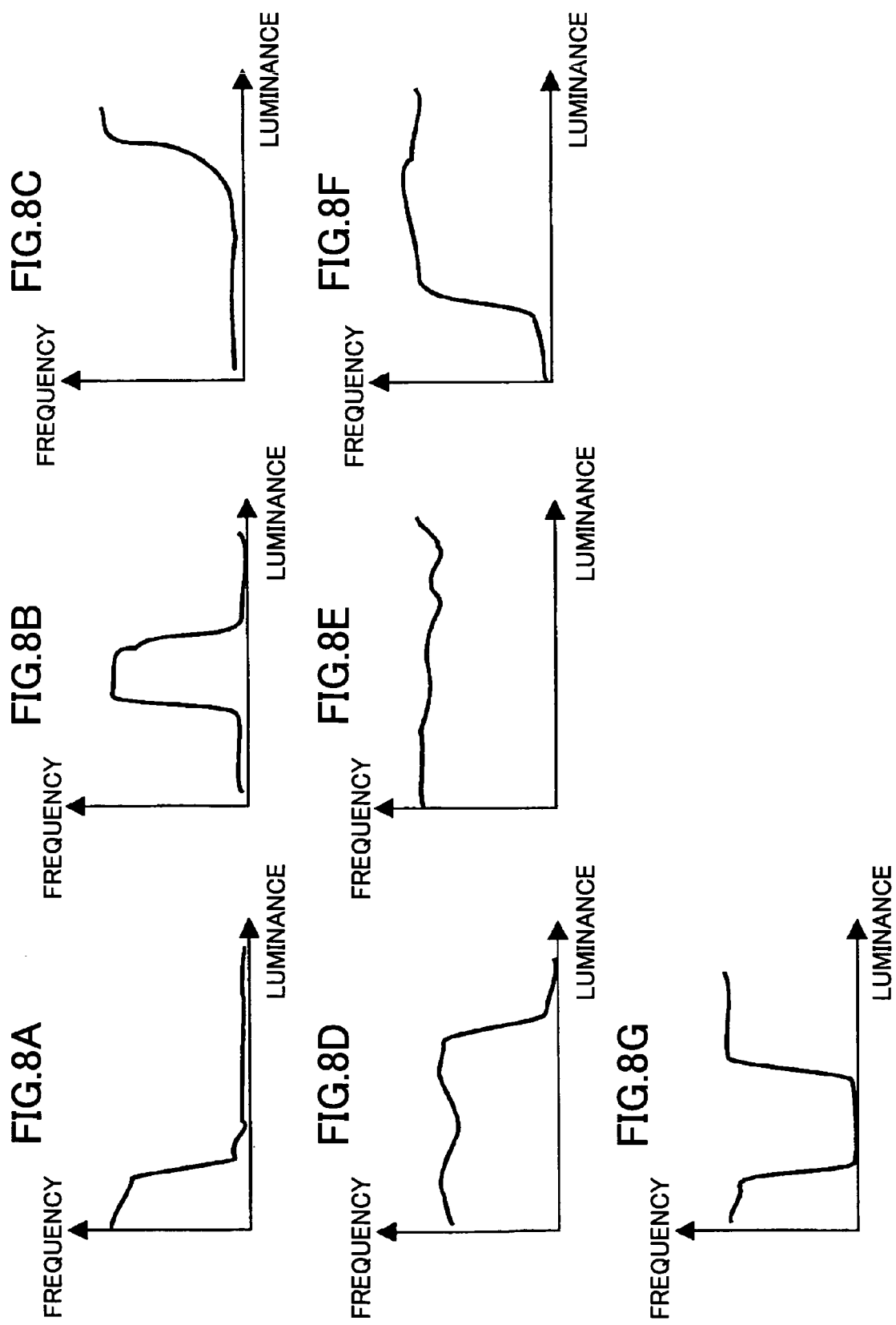

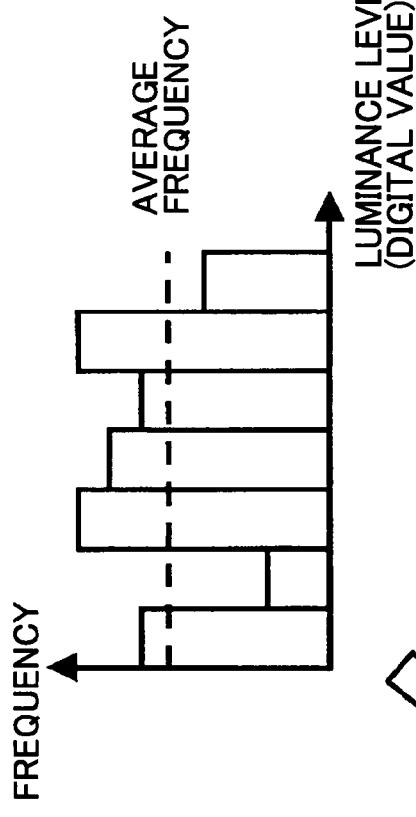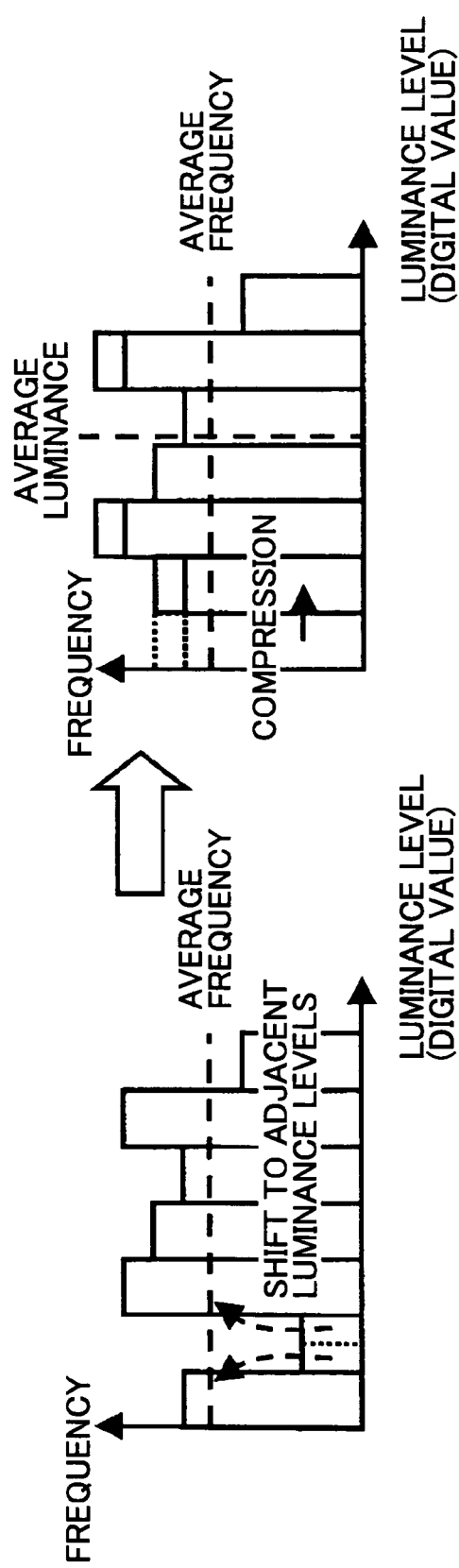

36 DATA ACQUIRING AREA

35 DISPLAY AREA

IMAGE REPRODUCING APPARATUS

BACKGROUND OF THE INVENTION

1. Field of the Invention

The present invention relates to an image reproducing technique for processing a high dynamic range input signal to reproduce an appropriate image signal suitable for an output or display device, which technique is applied to image reproducing and displaying apparatuses including liquid crystal displays or television monitors used along with digital cameras or video cameras.

2. Description of Related Art

Many studies and proposals have been made of image reproducing apparatus, such as liquid crystal monitors, used in or together with photographing apparatuses or image recording apparatuses (e.g., digital cameras or video cameras). For example, JP 2002-305684A discloses an electronic camera used in an image recording system in which multiple images of a same object taken under different exposure conditions are combined to generate and record a high dynamic range image at a tone resolution (or a gradation width) designated by a user. In this publication, the electronic camera performs high dynamic range photographing and reproduces appropriate image data suitable for an output device by selecting a tone resolution level lower than the that of the recorded image when displaying or outputting the photographed dynamic range image on a liquid crystal display or from a printer.

Another publication JP 11-317930A discloses a digital camera that allows a user or an operator to recognize a thumbnail image at which page he/she is browsing. With this publication, the operator can set the number of thumbnail images to be displayed at a page when displaying thumbnail images on a display screen, and display of page data is controlled by control means.

Other than these examples, there are many methods for displaying images so as to be easily viewable by the user in an image reproducing and display apparatus used along with a digital camera or other photographing apparatus.

However, with the former publication (JP 2002-305684), when actually displaying or outputting the composite image directly on a monitor screen or from a printer, an 8-bit or 6-bit synthetic image is generated in accordance with the display resolution of the output apparatus. Accordingly, if the output apparatus does not have a sufficient dynamic range, delicate nuance of the tone is lost. The gradation or the tone can be maintained if a high-performance output apparatus with a sufficient dynamic range is used; however, it imposes increased cost and expense.

Another problem arises when a portion of a high dynamic range image is zoomed or scrolled on the display screen. If dynamic range correction is performed on the zoomed or scrolled image using only a part of high dynamic range image data residing in the display frame area, and if a high luminance object comes into the frame, then the relative luminance level of a substantially white object is reduced. As a result, the original highlight image becomes dull.

For instance, when high dynamic range photographing is carried out within the frame shown in FIG. 3B, the exposure level is changed between the shadow in which dark objects are mainly photographed and the highlight in which bright objects are mainly photographed (by splitting the incident light so as to allow the beams to strike two sensors or CCD arrays, or alternatively, by photographing a still object twice at different exposure levels). In general, the exposure level of a highlight region is selected so as to prevent highlight information from being lost. If the scene shown in FIG. 3B is taken at an exposure level selected so as to take advantage of the dynamic range of the photographic apparatus, the luminance distribution shown in FIG. 1A is obtained. In this case, the snowcap of the mountain is the most highlighted area. (Since a physical quantity "absolute luminance" cannot be measured with a CCD camera, the saturation level of the imaging element becomes highlight.)

Next, if the scene shown in FIG. 3A including a high luminous object, such as the sun, is taken or displayed, the luminance distribution becomes one illustrated in FIG. 1B because the exposure level is selected so as not to be saturated at the highest luminance portion (that is, the sun).

In comparison with the distribution of FIG. 1A, the luminance level of the snowcap, which is the highest in FIG. 1A, slightly shifts to the gray side because it is lower than that of the luminous object such as the sun. As a result, snow white in FIG. 3B slightly turns into gray in FIG. 3A, and the image is dulled.

Furthermore, if dynamic range correction is made using the entire image data to perform tone compression down to 8-bit or 6-bit gradation, the subtle nuance of the image is lost and the user cannot see the delicate tone of the high dynamic range image taken by the camera.

If the difference in luminance level between the contour line of the major object and the background is very small (for example, with a level difference of 1 or 2 in 16-bit digital value), the boundary between the main object and the background becomes unclear in the reproduced image, as illustrated in FIG. 2A and FIG. 2B. In addition, for those portions with continuous gradation with a smooth tone change, pseudo contour line (which appears due to a quantization problem although no such contour line actually exists) is likely to be produced.

SUMMARY OF THE INVENTION

The present invention was conceived in view of the above-described problems, and it is an object of the invention to provide an image reproducing apparatus and method that allow a user to designate a display mode and perform dynamic range control using a suitable dynamic range control scheme selected so as to correspond to the designated display mode, thereby allowing a high dynamic range photographic image to be reproduced and displayed appropriately without using an expensive display device.

In one aspect of the invention, an image reproducing apparatus is operative in accordance with multiple display modes. The apparatus includes:

(a) a data reproducing unit configured to reproduce an image on a display based on high dynamic range image data acquired from an object and stored in a memory; and (b) a dynamic range control unit configured to control a dynamic range of the image to be reproduced on the display using one of different types of dynamic range control schemes in accordance with selected one of the display modes.

With this arrangement, dynamic range correction applied to a high dynamic range image is controlled in accordance with the display mode selected by a user.

In a preferred example, the display modes includes at least a full display mode, and a zoom and scroll display mode.

This arrangement allows a user to confirm both the entire arrangement and details of the photographed image based on the high dynamic range image data.

In another preferred example, the dynamic range control unit acquires pixel data of an image area to be displayed from the high dynamic range image data, and performs dynamic range control using the acquired pixel data.

With this arrangement, dynamic range correction is performed using high dynamic range image data of a necessary area suitable to image display, and computational workload can be maintained low.

In still another preferred example, the dynamic range control unit acquires pixel data of an image area to be displayed, together with additional pixel data surrounding the image area to be displayed, from the high dynamic range image data, and performs dynamic range control using the acquired pixel data.

This arrangement can prevent forming artifacts of displayed images during the scroll display mode.

In yet another preferred example, when the full display mode is selected, the dynamic range control unit thins out pixels from the high dynamic range image data and performs dynamic range control using the thinned-out pixel data.

This arrangement can reduce the computational time.

In yet another preferred example, when a zoom and scroll display mode is selected, and if the pixel data size of a selected area of the image to be zoomed is greater than the available pixel data size of the display device, then the dynamic range control unit thins out pixels from the selected area of the high dynamic range image data to be zoomed and performs dynamic range control using the thinned-out pixel data. If the pixel data size of the selected area of the image to be zoomed is smaller than or equal to the available pixel data size of the display, the dynamic range control unit performs dynamic range control using the selected area of the high dynamic range image data without thinning out.

This arrangement can also realize efficient dynamic range control with reduced computational time.

In yet another preferred example, if a zoom and scroll display mode is selected, the dynamic range control unit acquires pixel data in an image area to be displayed, together with additional pixel data surrounding the image area to be displayed, from the high dynamic range image data, and applies a weighting factor to the acquired pixel data during dynamic range control so as to allow luminance of a displayed image to vary smoothly.

With this arrangement, abrupt change in luminance level of the scrolled image can be prevented, and the user can see the scrolled image with less luminance change even if a super luminous object or an extremely low luminance object comes in the display frame.

BRIEF DESCRIPTION OF THE DRAWINGS

Other objects, features, and advantages of the invention will become more apparent from the following detailed description when read in conjunction with the accompanying drawings, in which:

FIG. 6A through FIG. 6E illustrate examples of scenes to be photographed;

FIG. 7A through FIG. 7E are examples of the histogram of a high dynamic range image;

FIG. 8A through FIG. 8G are examples of the histogram of another high dynamic range image;

FIG. 11A through FIG. 11C are diagrams used to explain compression of luminance level;

FIG. 14A and FIG. 14B illustrate examples of weighting of pixel values.

DETAILED DESCRIPTION OF THE PREFERRED EMBODIMENTS

The preferred embodiments of the present invention are described below in conjunction with the attached drawings.

First Embodiment

Figure 1A:
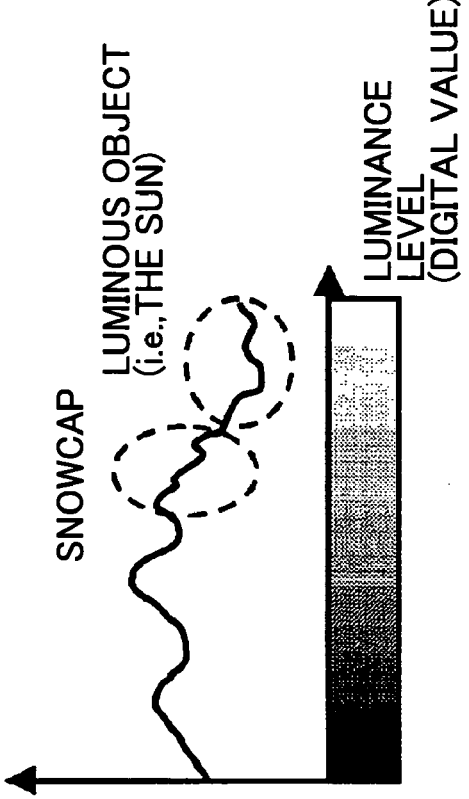
FIG. 1A and FIG. 1B illustrate examples of luminance level distribution.
Figure 1B:
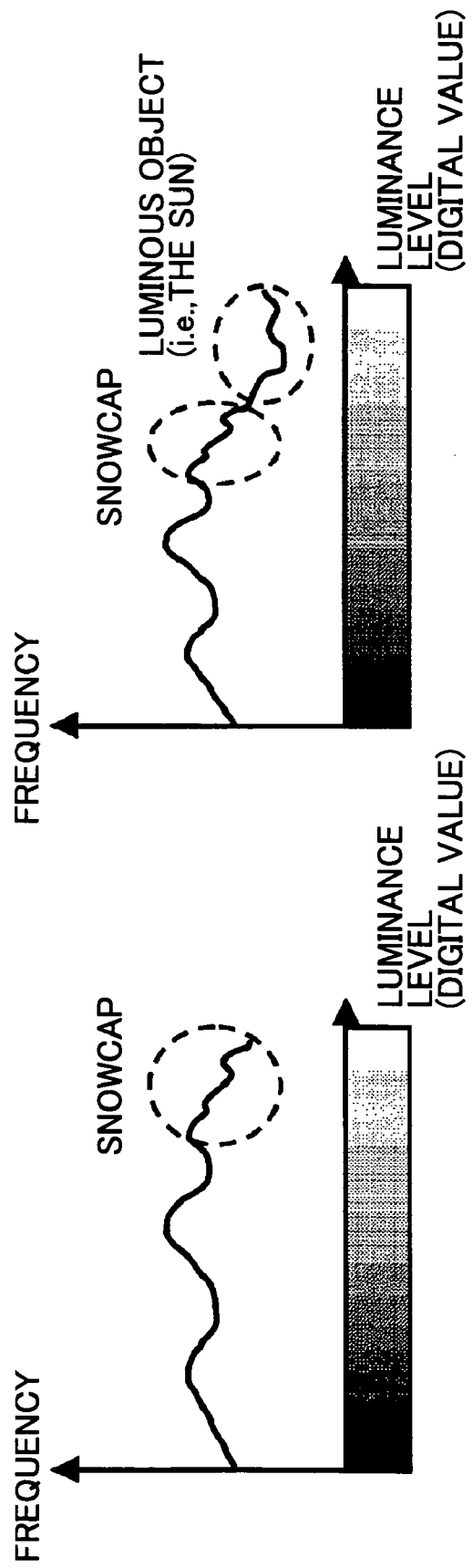
Figure 2B:
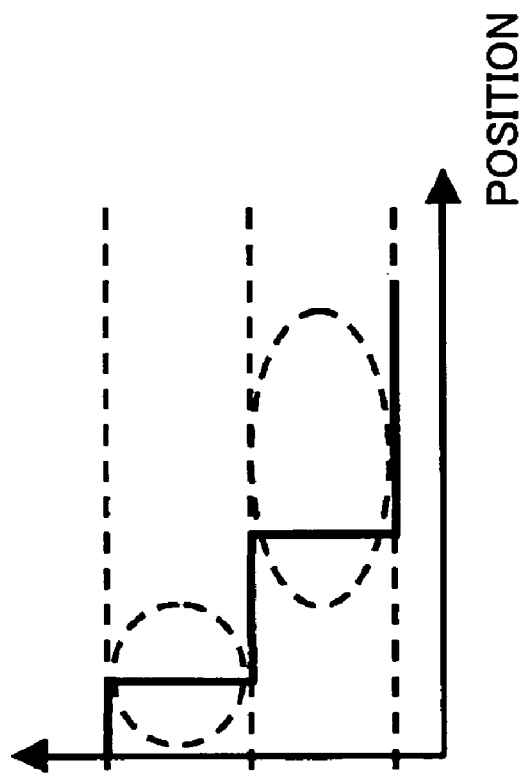
FIG. 2A and FIG. 2B illustrate examples of different tone gradation levels.
Figure 2A:
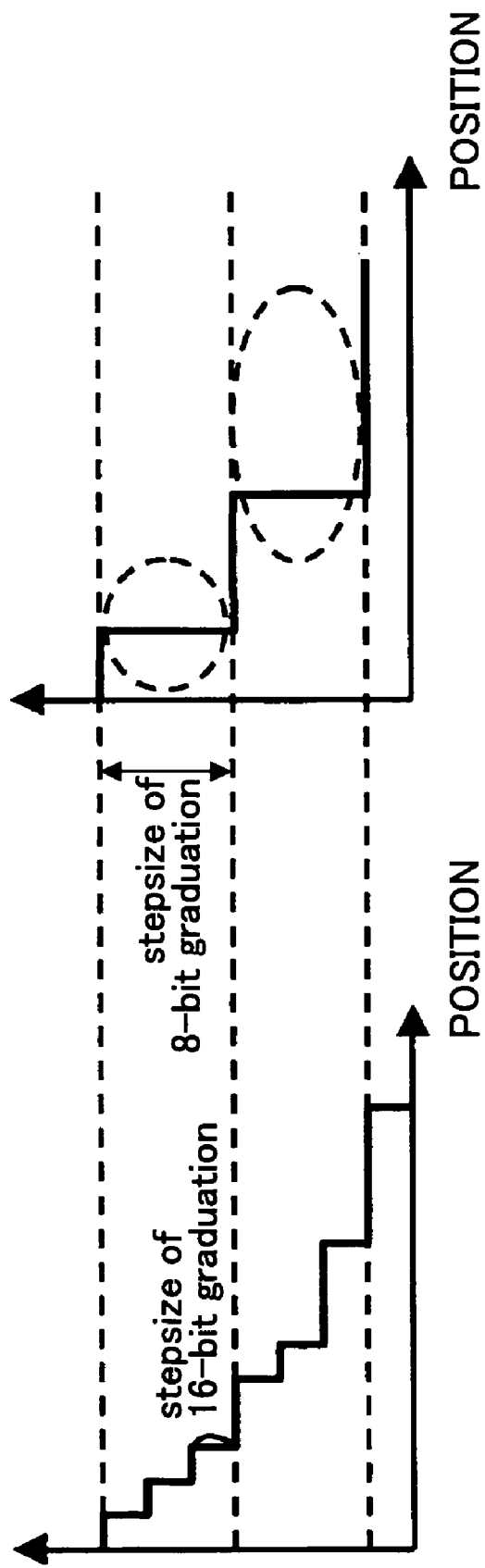
Figure 3A:
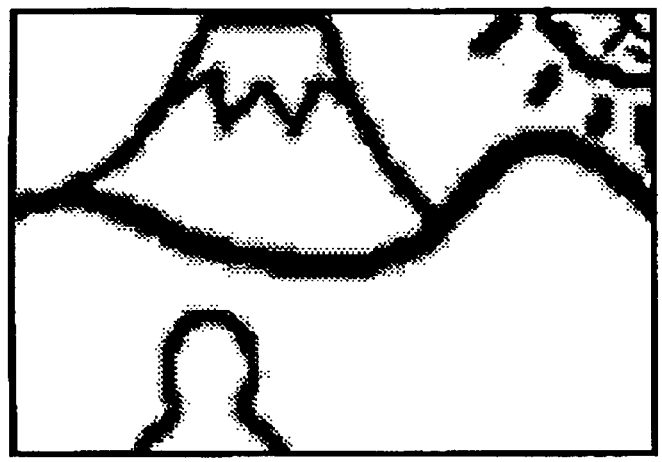
FIG. 3A and FIG. 3B are exemplified scenes to be taken.
Figure 3B:
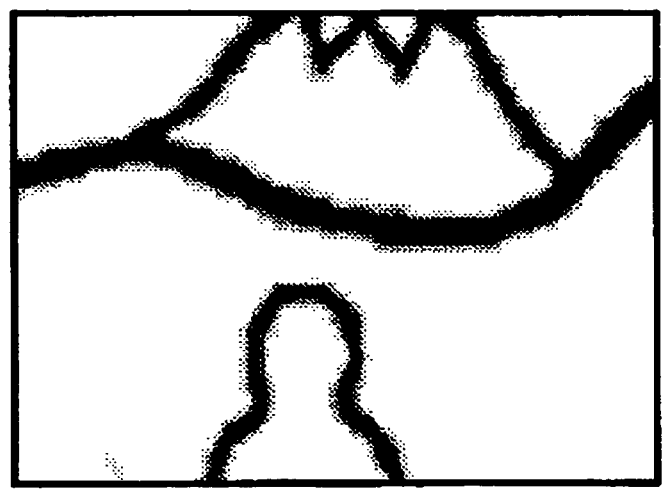
Figure 4A:
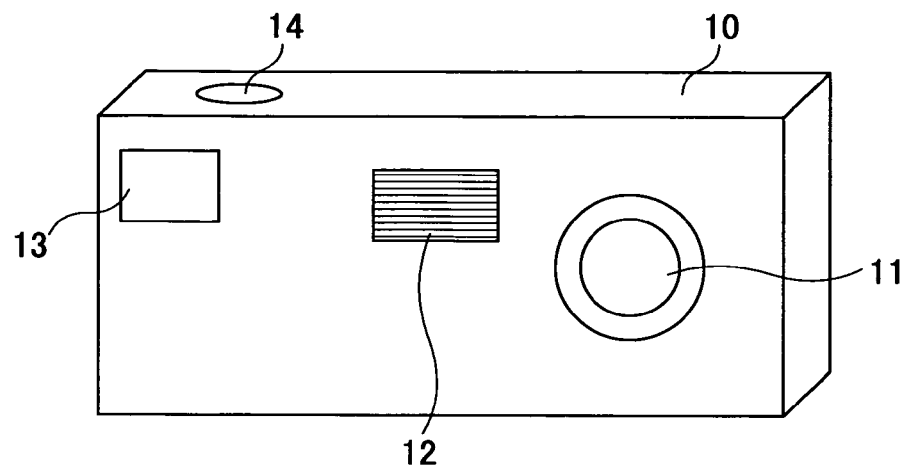
FIG. 4A and FIG. 4B are schematic perspective views of a digital camera according to an embodiment of the invention.
Figure 4B:
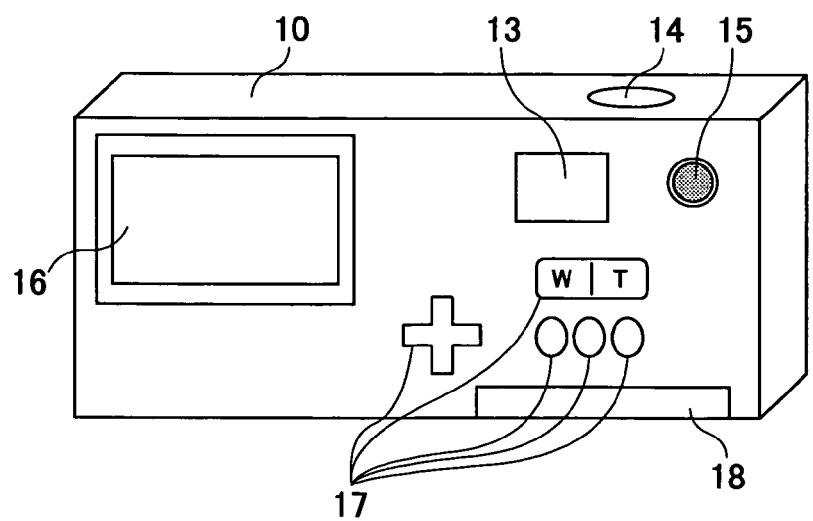

FIG. 4A and FIG. 4B are front and rear perspective views, respectively, of a digital camera according to an embodiment of the invention.

The digital camera has a photographic lens 11, a flash lamp 12 and a viewfinder 13 arranged on the front face of a case 10. A shutter button 14 is arranged on the top of the case 10. On the rear face of the case 10 are a view finder 13, a power source switch 15 for turning on and off the digital camera, a liquid crystal monitor 16 for displaying an object being taken and its reproduced image, a set of manipulation buttons 17, and a memory slot 18 in which a recording medium (such as a flash memory card or stick) is inserted to store the photographed image data. The display device is not limited to the liquid crystal display 16, and other display devices, such as an organic EL display or a plasma display panel, may be used.

Figure 5A:
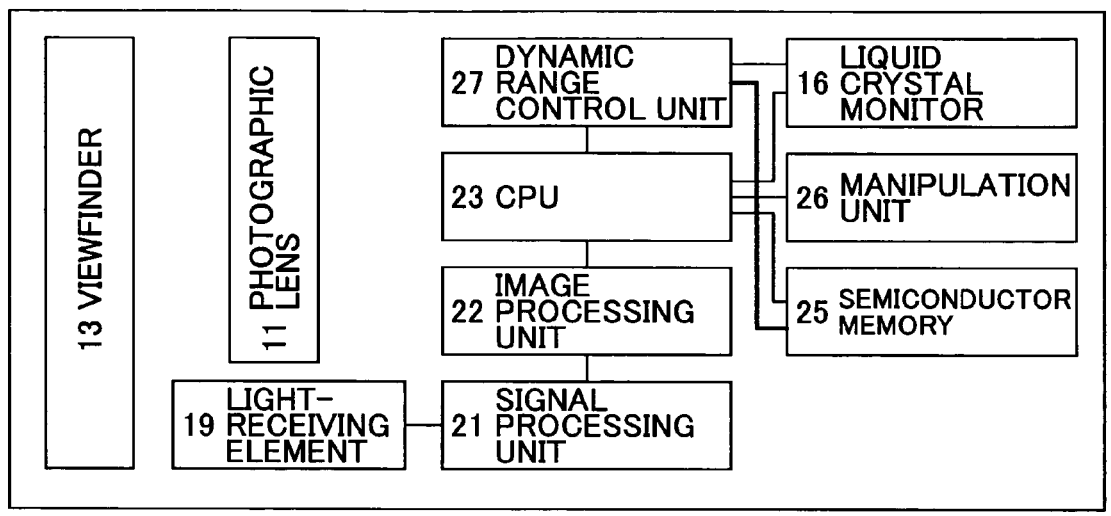
FIG. 5A and FIG. 5B are schematic block diagrams of a control system of the digital camera according to an embodiment of the invention.
Figure 5B:
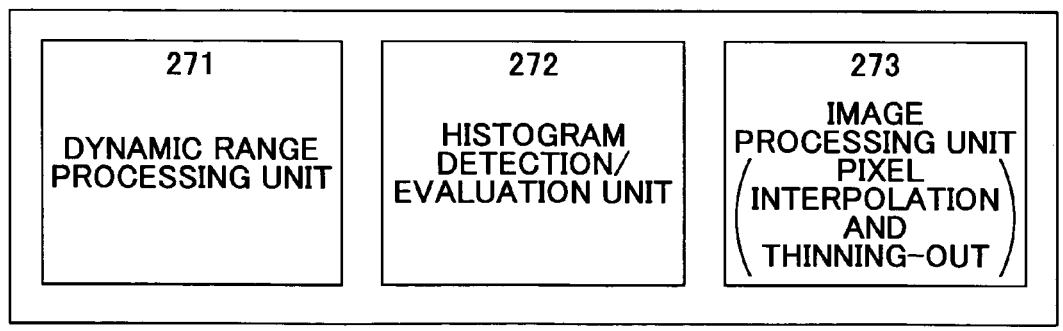

FIG. 5A and FIG. 5B illustrate a control system of the digital camera according to the embodiment. As illustrated in FIG. 5A, the control system includes a light receiving element (or image pick-up element) array 19 consisting of a CCD array or a CMOS array arranged near the photographic lens 11 to receive the light image captured by the photographic image of an object being taken. The high dynamic range image received at the light receiving element array 19 is successively subjected to signal processing and image processing at a signal processing unit 21 an image processing unit 22, respectively, and supplied to a CPU 23 having a ROM, a RAM, and other necessary elements. The CPU 23 controls the operations of the digital camera so as to store the processed image in a semiconductor memory 25 or display the stored image on the liquid crystal monitor 16 according to an instruction of the user supplied from a manipulation unit 26. The CPU 23 receives a user's instruction input through the manipulation button 17 (FIG. 4B) from the manipulation unit 26, and supplies it to a dynamic range control unit 27. The dynamic range control unit 27 reads high dynamic range image data from the semiconductor memory 25, performs dynamic range control consistent with the currently selected display mode, and displays the reproduced image on the liquid crystal monitor 16 according to the instruction from the CPU 23. As illustrated in FIG. 5B, the dynamic range control unit 27 has a histogram detection/evaluation unit 272 for detecting a histogram of the high dynamic range image data read from the semiconductor memory 25, a dynamic range processing unit 271 for performing dynamic range processing according to the histogram and the luminance distribution of the readout image, and an image processing unit 273 for performing interpolation and thinning-out of pixels.

Figure 9A:
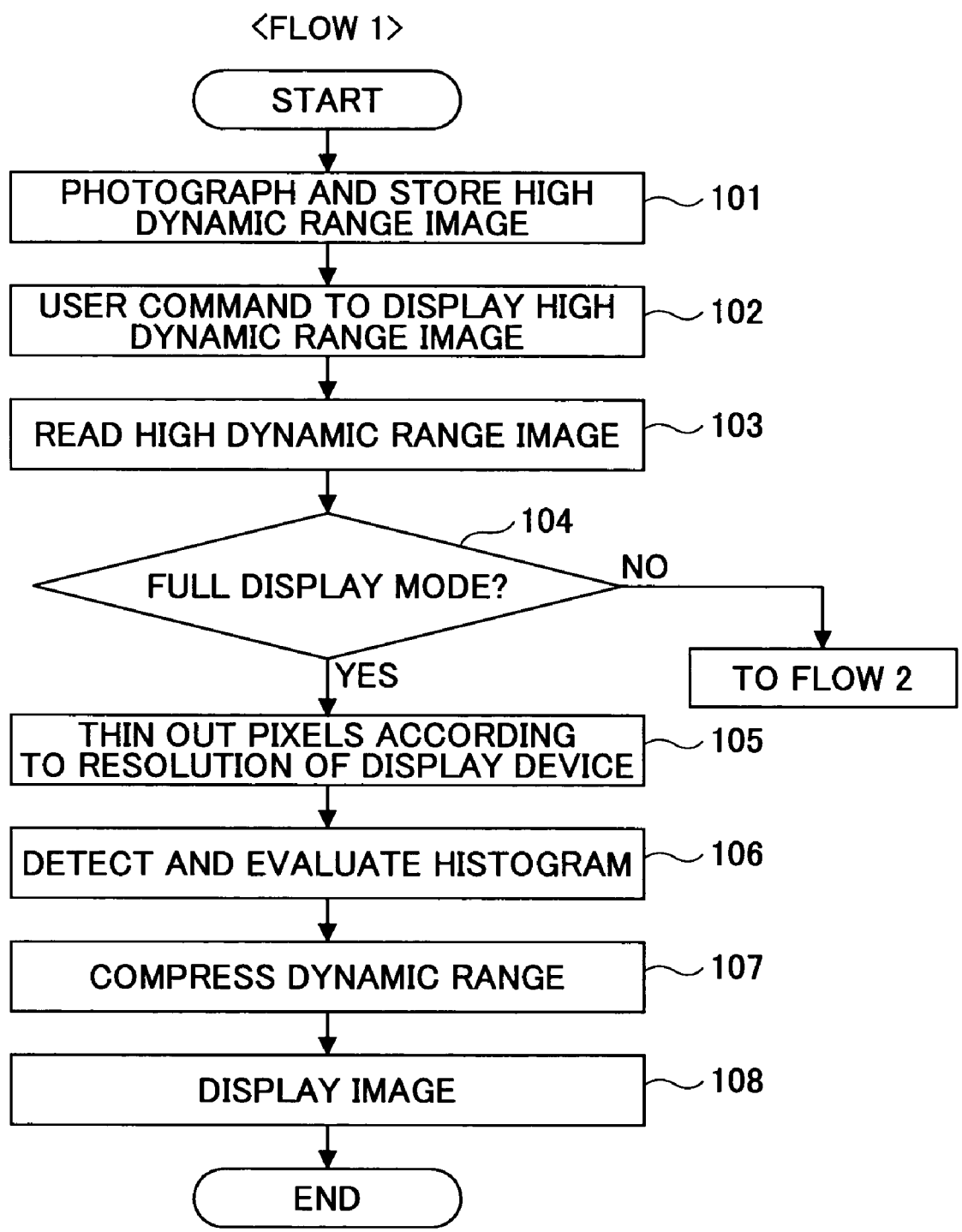
FIG. 9A through FIG. 9C are flowcharts of an image reproduction process according to an embodiment of the invention.
Figure 9B:
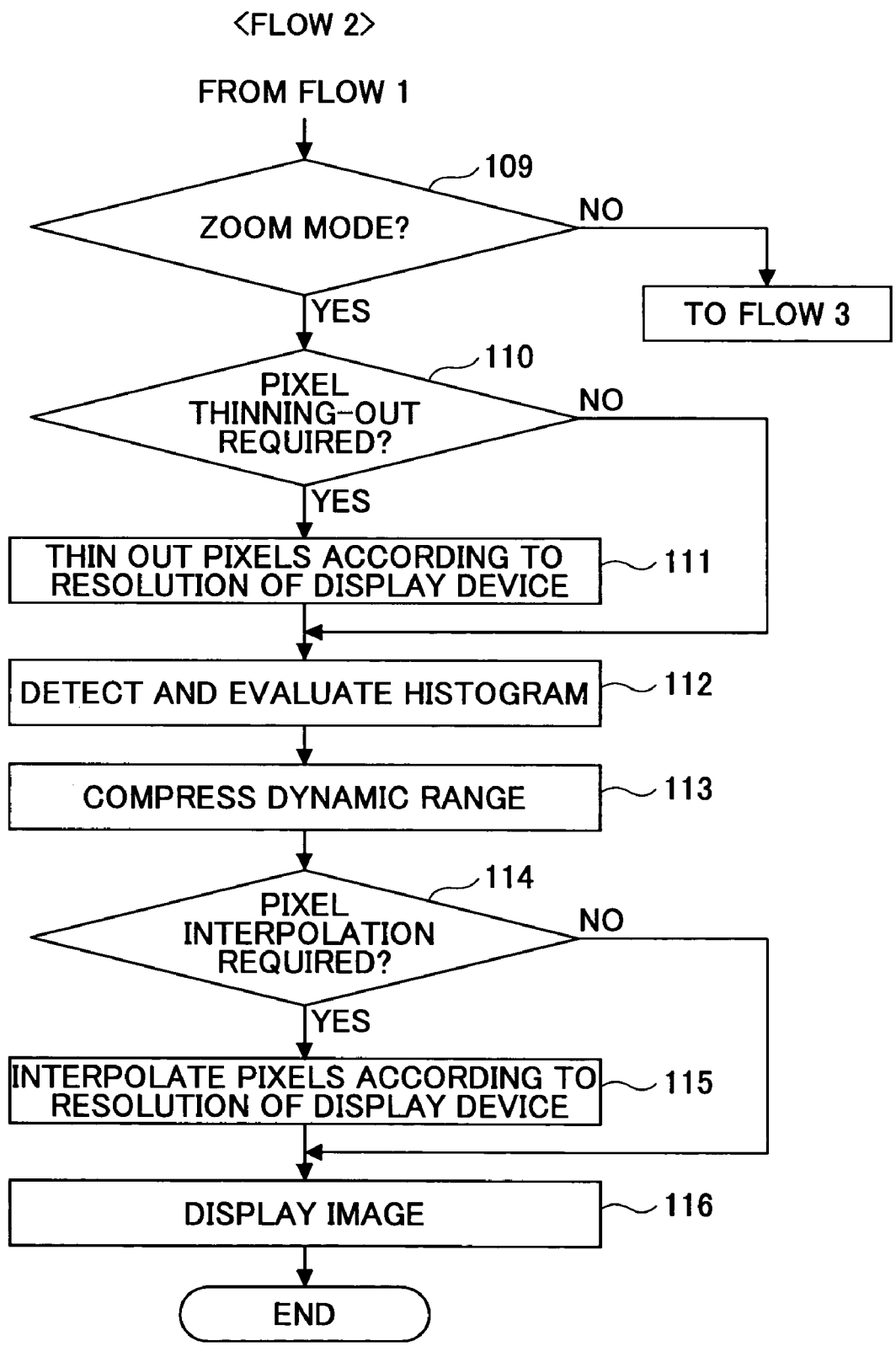
Figure 9C:
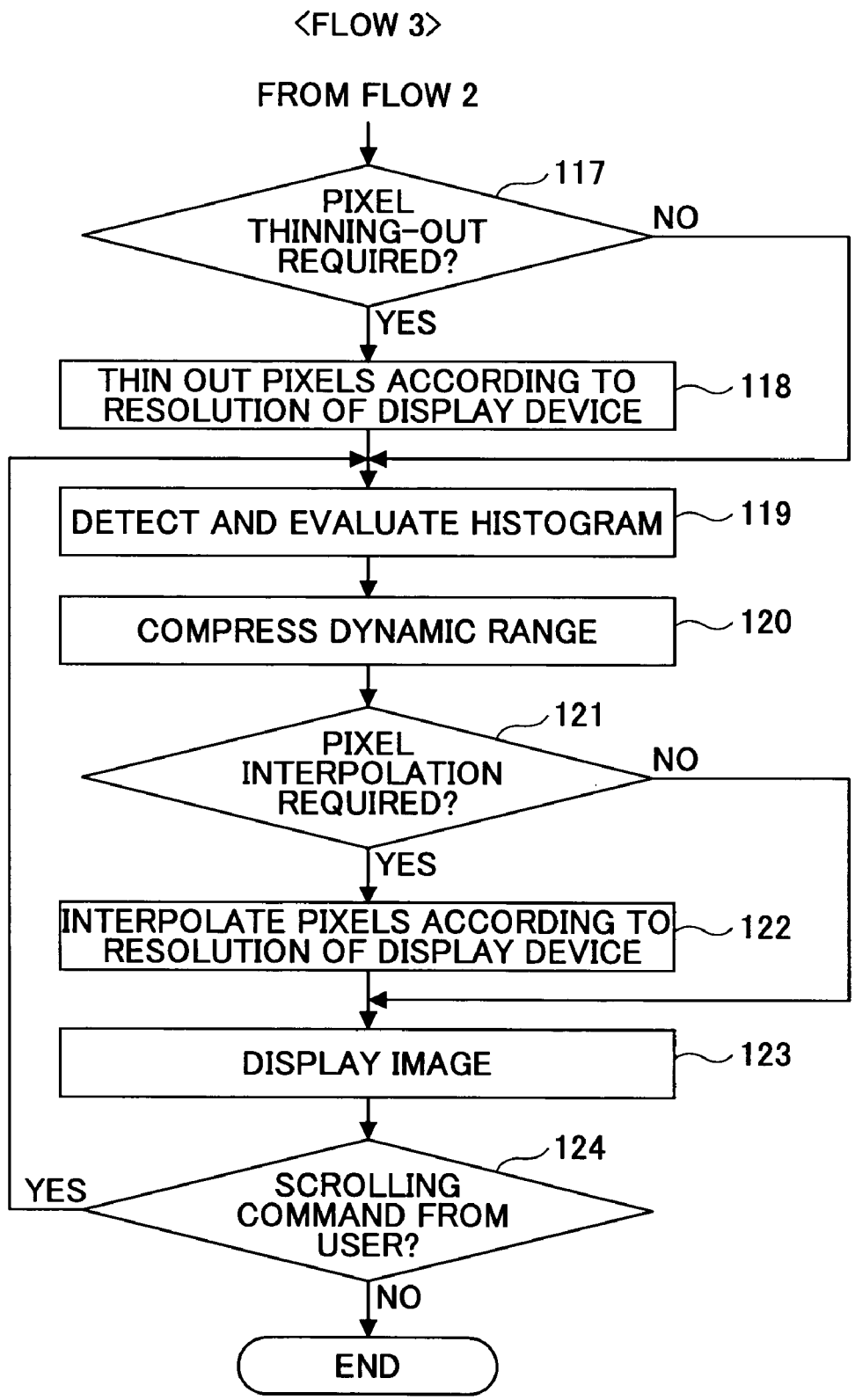

FIG. 6A through FIG. 6E illustrate examples of photographic scenes being taken in a high dynamic range. FIG. 7A through FIG. 7E and FIG. 8A through FIG. 8G are examples of the histogram of the high dynamic range image. FIG. 9A through FIG. 9C are flowchart of the image reproducing process according to an embodiment of the invention.

Compression or expansion of a high dynamic range image consistent with a selected display mode is explained in conjunction with FIG. 6A through FIG. 6E and FIG. 7A through FIG. 7E.

First, explanation is made of a display mode used in the embodiment of the invention.

(1) Full Display Mode

In the full display mode, a single image is displayed in the entire display area of the LCD (or other display device). This mode is to allow the user to recognize "what image is taken". To this end, compression taking full advantage of the dynamic range of the output end (the LCD, for example) is performed without paying much attention to the tone resolution or pseudo contour line. Such dynamic range image compression is expressed by $$D_{out} = D_{in} \times (D_{out\_Max} - D_{out\_Min}/D_{in\_Max} - D_{in\_Min}), \quad (1)$$

which equation is also described below. For example, if a 16-bit input image consists of pixels with digital values ranging from 10,000 to 50,000, and if the image data is compressed so as to be consistent with an 8-bit monitor (taking digital values ranging from 0 to 255), then the image data is compressed such that the image represented by digital values from 10,000 to 50,000 are converted to the range from 0 to 255, not compressing the entire 16-bit range from 0 through 65,535 to the 8-bit range from 0 through 255.

(2) Zoom and Scroll Display Mode

In this mode, a part of an image is zoomed on the display area of the display device (e.g., LCD), and the zoomed image is scrolled on the display. This mode has two sub-modes, namely, the zoom display mode and the scroll display mode. The zoom display mode allows the photographer or the user to confirm the details of the photographed image. The details of the image includes "blurring of images due to hand-held jiggle", "tone resolution (gradation quality)", and "reflectance texture (image noise)".

The scroll display mode allows the enlarged image zoomed in the zoom display mode to be scrolled using a cursor (such that each of the objects in a photographed image comes in and goes out of the display area).

Although not described in detail in this embodiment, the digital camera also has a thumbnail display mode, which mode is generally furnished in commonly used digital still cameras to display multiple photographed images simultaneously on the display device or the LCD (so as to allow the user to confirm the objects photographed so far).

FIG. 6A through FIG. 6E illustrate examples of a high dynamic range photographic scene, including a super luminous object, such as the sun or a electric bulb, a high luminous object, such as the sky, a medium luminous object, such as an ordinary person, and a low luminous object, such as a person standing in the shade. FIG. 7A through FIG. 7E are examples of histograms representing how many pixels exist at what luminance levels in high dynamic range image data (stored as a 16-bit digital value ranging from 0 to 65535 for each pixel).

The image reproducing processing using the histograms is now explained with reference to the flowcharts shown in FIG. 9A through FIG. 9C.

After a high dynamic range image is photographed and stored (step 101), the user inputs an instruction for displaying the high dynamic range image, designating the full display mode so as to display the entirety of the photographed image, as illustrated in FIG. 6D, using the manipulation button 17 (step 102). The dynamic range control unit 27 reads the selected high dynamic range image data from the semiconductor memory 25 (step 103). Since the full display mode is selected in this case (YES in step 104), the process proceeds to step 105 to thin out pixels prior to compression or expansion of the high dynamic range image so as to be consistent with the pixel resolution of the liquid crystal monitor 16 (step 105). Assuming that the display pixel resolution of the liquid crystal monitor 16 is 640×480 (about 300,000 pixels), a 1280×960 (about 1.2 million) pixel high dynamic range image has to be thinned out up to a quarter of the pixels in order to display the high dynamic range image on this monitor. To achieve this, for example two squared pixels (that is, four pixels) are averaged in luminance to reduce the number of pixel values to be displayed on the monitor 16. The resizing of the image data may be carried out after compression or expansion of the dynamic range image; however, it may cause the calculation time to increase when controlling a nonlinear dynamic range. To avoid this, the pixel data are thinned out in advance so as to be consistent with the pixel resolution of the display monitor prior to the dynamic range control. This arrangement can shorten the time lag from user's instruction to actual image display.

In recent high-end digital still cameras, the electric signals output from image pick-up elements of a CCD array or a CMOS array are stored as they are in a format named RAW. In this case, users can easily adjust the hue of the photographed image using application software called RAW develop software. In contrast, image data stored in an ordinary format (e.g., JPEG format) other than RAW have been degraded through the developing process carried out by the image processor of the camera, and it is generally difficult to make desired adjustment of the hue using the degraded image data. In addition, it is easy to assume that the monitor display of a personal computer or a printer is superior in representation ability to the display panel of a digital still camera.

The thinned-out image data are then subjected to dynamic range control in the subsequent steps 106 and 107. To be more precise, a histogram of the thinned-out image data is detected and evaluated in step 106, and then, based on the detected histogram, dynamic range compression is performed. The major purpose of the full display mode is to allow the user to confirm which objects have been taken and in which positions they are located in the photographed image, and the detailed tone reproduction is seldom checked. For this reason, the dynamic range of image data has to be controlled for each of the photographed images so as to facilitate a rough grasp of the shape of the photographed object. If there is not a large bias in the luminance distribution (histogram) of the image data, as illustrated in FIG. 7A, FIG. 7B and FIG. 7D, then control for a linear dynamic range expressed by Equation (1) may be performed, or alternatively, a known dynamic range control technique disclosed in, for example, Garrett M. Johnson and Mark D. Fairchild, "Rendering HDR Images", the 11$^{th}$ Color Imaging Conference, may be employed.

On the other hand, if the luminance distribution represented by the histogram is greatly biased, as illustrated in FIG. 7C and FIG. 7E, a known control technique for nonlinear dynamic range is performed. Alternatively, the luminance levels of those pixels whose frequencies are less than a prescribed percentage (e.g., 0.1%) of the total number of pixels may be shifted to the adjacent luminance levels to compress the dynamic range in advance, and then linear reproduction is carried out. In the latter case, an image in which each of the photographed objects is easily discriminated is displayed on the liquid crystal monitor 16 with a dynamic range narrower than that of the high dynamic range image, without causing highlight information and shadow information to be lost. Of course, the dynamic range control is not limited to the above-described methods, and other suitable methods may be employed. For example a method proposed in JP 2001-118062 may be employed.

After dynamic range control is performed (step 107) based upon the detected histogram (or luminance distribution), the processed image data are displayed on the liquid crystal monitor 16 (step 108).

Figure 10B:
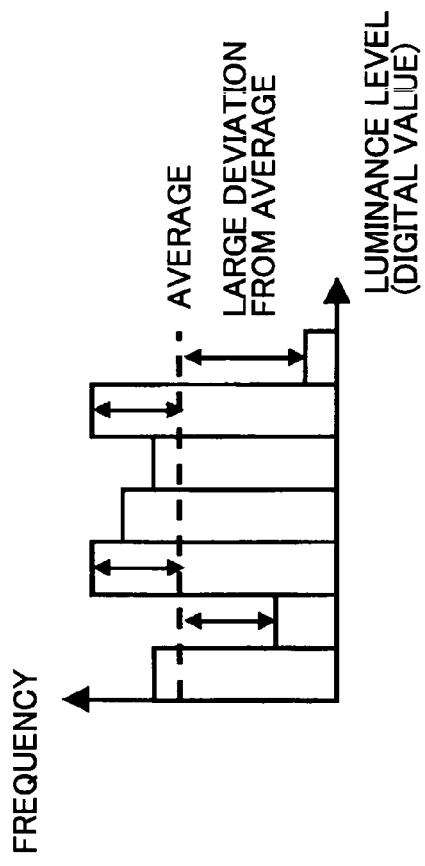
FIG. 10A and FIG. 10B are graphs of luminance level distributions with and without large deviation, respectively.
Figure 10A:
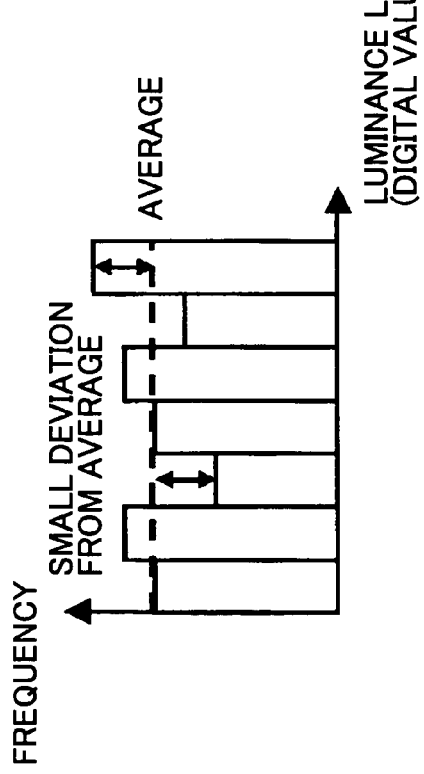

In evaluation of bias in luminance distribution (step 106), the luminance levels (0 to 65535 in 16-bit gradation and 0 to 255 in 8-bit gradation) are converted to groups 0-5000, 5001-10000, . . . , the average frequency is calculated, and the difference between the average and the frequency of that group for each of the groups is determined, as illustrated in FIG. 10A and FIG. 10B. If the difference between the average and the group frequency is less than a threshold, as illustrated in FIG. 10A, it is determined that the bias in the luminance distribution is small. On the other hand, if there is a group with a large difference from the average frequency over the threshold, as illustrated in FIG. 10B, then it is determined that the luminance distribution is greatly biased.

An example of the above-described nonlinear dynamic range control is shown below.
(1) A digital image represented by RGB data values is read out of the flash memory.
(2) The histogram of the digital image is detected and evaluated, and if it is determined that nonlinear reproduction is required, then the subsequent steps are further performed.
(3) The RGB digital image is transformed to an XYZ tri-stimulus image. A transform matrix is determined by the tri-chromatic coordinates of the RBG primary colors and the chromaticity coordinate of white of a device. Accordingly, a device-dependent and chromaticity-space-dependent transform matrix is used.
(4) The XYZ tri-stimulus values are converted to RGB tri-stimulus values (which are different from the readout RGB digital values) using a prescribed transform matrix.
(5) A lowpass filter is generated.
(6) The XYZ tri-stimulus values obtained in step (3) are multiplied by the lowpass filter in frequency space.
(7) The product (XYZ tri-stimulus image)*(lowpass filtering) determined in step (6) is transformed to an image represented by RGB tri-stimulus values in the same manner as step (4).
(8) Chromatic adaptation is performed on the RGB tri-stimulus image generated in step (4) using the lowpass filtered XYZ tri-stimulus image obtained in step (6), and the chromatically adapted RGB tri-stimulus image is inversely transformed to an XYZ tri-stimulus image.
(9) The XYZ tri-stimulus image obtained in step (8) is transformed in an image represented by LMS cone responses using a prescribed matrix.
(10) The Y (luminous information) image of the XYZ tri-stimulus image obtained in step (3) is lowpass filtered, and a nonlinear dynamic range compression coefficient is generated for each of the pixels of the input image data using a prescribed function.
(11) The LMS cone response image obtained in step (9) and the nonlinear dynamic range compression coefficient generated in step (10) are combined using a prescribed function to generate an L'M'S'∝ image after having been subjected to nonlinear dynamic range compression.
(12) Inverse transform backward to step (9) is performed to obtain an XYZ tri-stimulus image.
(13) The XYZ tri-stimulus image obtained in step (12) is transformed to an RGB digital image using a transform matrix or a profile taking the characteristic of the display device (e.g, LCD) into account.

Next, an example of linear transform (reproduction) performed after shifting of a not-frequently appearing luminance level to the adjacent luminance levels and dynamic range compression when, for example, only 0.1% or fewer pixels are distributed in that luminance level is explained.
(1) An RGB digital image is read out of the flash memory.
(2) The histogram of the read out image is detected and evaluated. (It is assumed that the frequency of a certain luminance level is much lower than the average because of the threshold of a very low percentage.)
(3) Assuming that the image data have a histogram (distribution) shown in FIG. 11A, the frequency of the second luminance level from the left is very low. In this case, the number of pixels with this luminance level is a few, and accordingly, the luminance level is absorbed in the adjacent levels.

Figure 12:
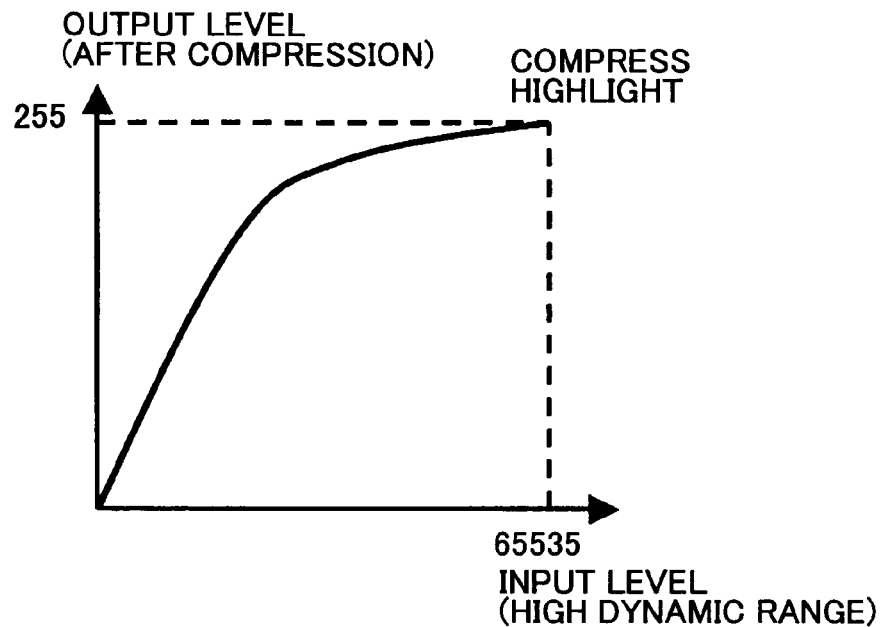
FIG. 12 is a graph showing a nonlinear input/output characteristic.

If the stepsize of the histogram is 50, then digital values representing 51-100 belong to this group. In this case, a half of the stepsize, that is, 25 is subtracted from the former values 51-75 to shift these luminance values to 26-50, while a half of the stepsize is added to the latter values 76-100 to shift these luminance values to 101-125, as illustrated in FIG. 11B.
(4) After the non-frequent luminance level (less than a prescribed percentage) is shifted to or absorbed in the adjacent luminance levels, the histogram is compressed to close up to the average luminance, as illustrated in FIG. 11C. In this example, the luminance level of the leftmost group is shifted to the higher side. In other words, 50 is added to each of the luminance levels included in group 0(1) to 50 so as to shift to 51-100.
(5) After the compression with respect to those pixels at a non-frequent luminance level (at which level very few or almost no pixels exist), nonlinear compression is performed using a function with a nonlinear input/output characteristic, as illustrated in FIG. 12. In FIG. 12, the curve has a knee characteristic, and the function has an effect for compressing the highlight side. Because the luminance level is high near around a luminous object, and because the change in luminance is hard to recognize, the luminance distribution in highlights is compressed. On the other hand, gradation levels are guaranteed in shadow or at medium luminance level.

As has been described above, when a high dynamic range image is reproduced in the full display mode in an image reproducing apparatus, dynamic range control is performed after photographed data are thinned out so as to be suitable for the number of pixels of the monitor. Accordingly, a full image is displayed on a display device (e.g., a liquid crystal monitor) whose dynamic range is narrower than that of the original image data so as to allow the user to easily perceive the full picture.

Second Embodiment

The second embodiment of the invention is described in conjunction with FIG. 4 through FIG. 8, and FIG. 9B. In the second embodiment, a high dynamic range image is displayed in the zoom or scroll display mode, in place of the full display mode, according to user's instruction input through manipulation button 17.

Since the structures shown in FIGS. 4A, 4B, 5A and 5B are in common with those in the first embodiment, and since the operation flow up to acquisition and readout of a high dynamic range image data (up to step 104 in FIG. 9A) is the same as that in the first embodiment, explanation for them is omitted.

If the user instructs to zoom a part of a high dynamic range image shown in FIG. 6D after the high dynamic range image data are acquired (step 109 in FIG. 9B), the pixel data size of the selected area of the image to be zoomed is adjusted taking the number of pixels of the liquid crystal monitor 16 into account. If the number of pixels contained in the selected portion of the image data to be zoomed up is greater than that of the display device (YES in step 110), the pixels of the selected area are thinned out so as to be consistent with the number of pixels of the liquid crystal monitor 16 (step 111). If the number of pixels of the image area to be zoomed is substantially the same as or less than that of the liquid crystal monitor 16 (NO in step 110), then it is unnecessary to thin out the pixels, and the process proceeds to step 112 to perform dynamic range control. By skipping the thinning step when the number of pixels of the liquid crystal monitor 16 is greater than or equal to that of the selected image area, computational workload is reduced.

Now explanation is made of dynamic range control in the zoom display mode. The originally photographed image includes a high luminance part containing a luminous object as illustrated in FIG. 6A, as well as a medium luminance part containing an ordinary figure illustrated in FIG. 6B and a low luminance part containing a face of a person illustrated in FIG. 6C. In this case, the histogram of the display range has a distribution illustrated in FIG. 7A. In general, displaying a part of a high dynamic range image in the zoom display mode is conducted for the purpose of determining the details of the photographed image immediately after the image is taken, for example, checking whether details are lost, whether gradation in shadow and highlight is lost, whether hand-held jiggle has occurred, etc. In this case, the method described in the first embodiment, namely, shifting or absorbing a non-frequency luminance level of pixels to or in the adjacent luminance level to compress the dynamic range is unsuitable because gradation is lost in many parts and details of the image cannot be perceived. Accordingly, in the zoom display mode to display an enlarged part of the high dynamic range image, it is preferable to perform a known dynamic range compression technique taking into account the nature of each detailed area of an image or visual perception of human eyes (see the above-described publication of G. M. Johnson and M. D. Fairchild), or alternatively, to perform nonlinear dynamic range compression so as not to loose the details of the image.

The same applies to the compression of the medium luminance image part shown in FIG. 6B with the luminance distribution (histogram) shown in FIG. 7B and the low luminance image part shown in FIG. 6C with the luminance distribution (histogram) shown in FIG. 7C. For these cases, dynamic range compression is performed so as not to lose the details of the image.

In addition to the selection of an appropriate compression method depending on the display mode, range control is performed in the output end when carrying out compression or expansion in this embodiment. For example, it is assumed that a high dynamic range input image signal is a 16-bit 65536-gradation signal, and that an output signal from the liquid crystal monitor 16 is a 8-bit 256-gradation signal. In this case, if the pixel values of the input image data range from 32000 to 65535, which means that the input image does not includes a low luminance part, and if dynamic range compression is performed simply by being mapped to the range from 0 to 255 of the output end, the medium luminance part in the input image turns into a low luminance part at the display end, and the image is darkened. To avoid this, in the embodiment, the output end dynamic range is controlled according to the distribution of the histogram of the high dynamic range input image data (steps 112 and 113 in FIG. 9B)

For instance, the 256 gradation levels of the output end are divided into sub-ranges of 0-85, 86-170, and 171-255. If the input image data have a histogram (luminance distribution) shown in FIG. 8A, which distribution mostly consists of a low luminance part, the input image data are compressed to the range from 0 to 210 (that is, from shadow to the middle of the high luminance range 171-255). In this case, dynamic range compression or expansion can be performed without using highlight range of the output end. If the input image data have a distribution shown in FIG. 8B mostly consisting of a medium luminance range, the dynamic range image is compressed to the output range of 40 to 210 without using shadow and highlight. If the input image data have a distribution shown in FIG. 8C mostly consisting of a high luminance range, the dynamic range image is compressed to the output range of 40 to 255 without using shadow. If the input image data have a distribution profile illustrated in FIG. 8D mostly consisting of the low to medium range lacking a high luminance range, the dynamic range image is compressed to the output range of 0 to 210. If the input image data distribute over the entire luminance range as illustrated in FIG. 8E, then the dynamic range image is compressed to the overall output range from 0 to 255. If the input image data have a distribution shown in FIG. 8F lacking of the low luminance range, the dynamic range image is compressed to the output range of 40 to 255. If the input image data have a distribution shown in FIG. 8G consisting of only the low luminance range and the high luminance range without the medium range, the dynamic range image is compressed to the overall output range so as to use both shadow and highlight. This arrangement can prevent unnatural dynamic range control in which the low luminance area of the original image data is converted to highlights of the output image.

As to the determination of the histogram distribution, the input-end luminance level may be grouped into three ranges 0-21800, 21801-43600, and 43601-65535, and if the accumulated number of pixels of each range is within 3%, it may be regarded that substantially no information in that luminance range is contained in the input image. The number of ranges to be grouped may be further increased, or alternatively, other suitable methods may be employed to determine the distribution profile.

After the dynamic range control, necessity of interpolation is determined (step 114), and if necessary (that is, if the number of pixels of the zoomed image to be displayed is less than that of the liquid crystal monitor 16), pixel interpolation is performed on the image data such that the number of pixels included in the zoomed image becomes substantially equal to that of the liquid crystal monitor 16 (step 115). Then, the zoomed image is displayed (step 116).

In this manner, when the image reproducing apparatus reproduces a part of the high dynamic range image in the zoom display mode, the selected area of the input image to be zoomed is resized so as to be suitable for the number of pixels of the monitor display, and then the dynamic range control is performed on the resized selected area of the high dynamic range image. Accordingly, the user can easily check details of the high dynamic range photographic image.

Third Embodiment

The third embodiment of the present invention is described in conjunction with FIG. 4 through FIG. 6, FIG. 9C, FIG. 13 and FIG. 14. In the third embodiment, the user selects the zoom and scroll display mode using the manipulation button 17 to enlarge a part of a high dynamic range image and scroll the zoomed part. The data acquisition area of the high dynamic range image for dynamic range control is different from that of the second embodiment.

The structures shown in FIGS. 4A, 4B, 5A, and 5B are in common with those in the first and second embodiments, and the operation flow up to the resizing of a selected area of the image data to be zoomed is the same as that illustrated in the second embodiment. Accordingly, explanation for them is omitted.

If the currently selected mode is the zoom and scroll display mode (NO in step 109 in the operation flow shown in FIG. 9B), the operation flow shift to flow 3 shown in FIG. 9C. The selected area of the input image data to be zoomed is resized in accordance with the pixel resolution of the display device (step 117 and step 118) as in the second embodiment.

Figure 13:
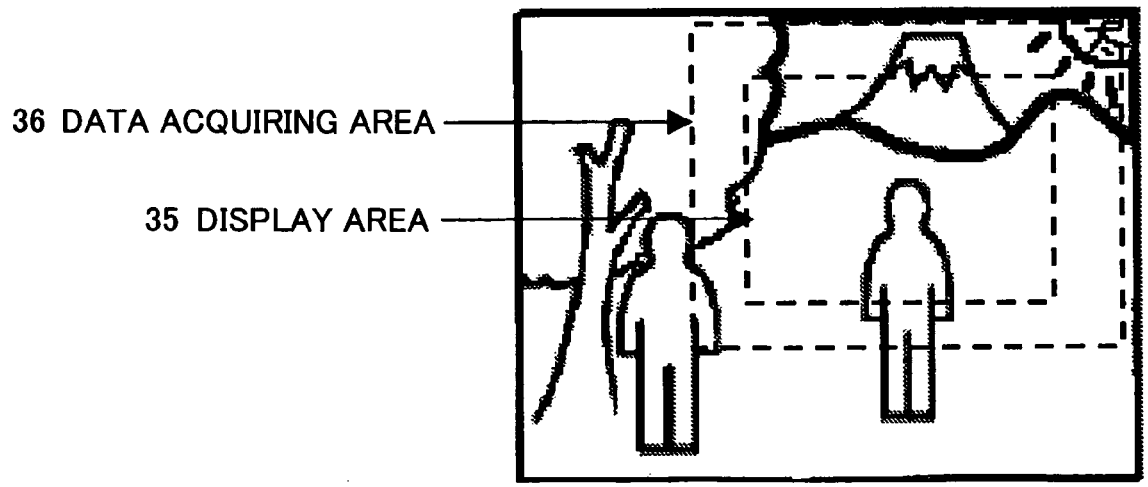
FIG. 13 illustrates an image data item used in the third embodiment.

If the zoomed image shown in FIG. 6E is scrolled to another part of the zoomed image shown in FIG. 6A, a super luminous part comes into the display area, and the histogram distribution abruptly changes. As a result, the luminance level of the highlight in the previous image shown in FIG. 6E falls relative to the super luminous object in FIG. 6A, and snow white in the previous image is dulled, resulting in an unnatural display image. To avoid this problem, when carrying out dynamic range control in the zoom and scroll display mode, not only the pixel data in the display frame area 35, but also the pixel data in the surrounding area are acquired, as illustrated in FIG. 13. In other words, the expanded data acquisition area 36 is set for the dynamic range control in the zoom and scroll display mode. The histogram is detected and evaluated for the expanded data acquisition area 36 (step 119) and dynamic range control is performed based on the histogram distribution of the expanded data acquisition area 36 (step 120).

To be more precise, two sets of image data, namely, an image data set obtained through dynamic range control of the pixel data in the ordinary display frame area 35 and an image data set obtained through dynamic range control of the pixel data in the expanded data acquisition area 36, are prepared. In this case, the pixel values in the common area (which agrees with the display frame area 35) differ between the two sets of image data. The pixel values at the same location in the two image data sets are added together after a weighting operation. The pixel value of the display frame area 35 is weighted by the weighting factor shown in FIG. 14A, and the pixel value of the expanded data acquisition area 36 is weighted by the weighting factor shown in FIG. 14B. By adding the independently weighted pixel values, the dominant component of the pixel value smoothly varies such that the influence of the expanded data acquisition area 26 is more reflected than the influence of the ordinary display frame area 35 as the pixel location shifts from the center to the periphery of the display area.

The weighting factors applied to the pixel values are not limited to the examples shown in FIG. 14A and 14B, and functions expressed by Equations (2) and (3) may be applied as weighting functions to the pixels in the data acquisition area 36 and the display frame area 35, respectively. In this case, the weighting factors are represented as a function of the distance from the center of the displayed image.

$$K_{36}(r) = 1/(r_{max} * r_{max}) * r^2 \quad (2)$$

$$K_{35}(r) = 1 - K_{36}(r), \quad (3)$$

where r denotes a distance to the center of the display frame area.

Returning to FIG. 9C, after the dynamic range control using the expanded data acquisition area, necessity of pixel interpolation is determined (step 121), and if necessary, the dynamic range controlled image data are resized (step 122) and displayed on the display device (step 123). If a further scrolling instruction is input by the user (YES in step 124), the process returns to step 119, and repeats the steps from 119 to step 124 using the photographed high dynamic range image.

In this manner, if the zoom and scroll display mode is selected, the image reproducing apparatus performs dynamic range control taking into account the additional pixel data surrounding the image display area to be zoomed after resizing of the image data of the zoomed portion. Consequently, a natural scrolled image avoiding abrupt change in luminance level can be displayed even if a super luminous object or an extremely low-luminance object suddenly comes into the display frame.

This patent application is based on and claims the benefit of the earlier filing date of Japanese Patent Application No. 2005-051232 filed Feb. 25, 2005, the entire contents of which are hereby incorporated by reference.

What is claimed is:

1. An image reproducing apparatus, comprising:
   a data reproducing unit configured to reproduce an image based on high dynamic range image data;
   a selecting unit configured to select a display mode from a full display mode and a zoom and scroll display mode; and
   a dynamic range control unit configured to control a dynamic range of the image in accordance with one of the display modes selected by the selecting unit,
   wherein in the zoom and scroll display mode the dynamic range control unit controls the dynamic range of the image based on pixel data including pixel data of an area outside of the image reproduced by the data reproducing unit, a weighting for dynamic range control of the image data is represented as a function of distance from a center of the image data such that a weighting for dynamic range control of the image data which is outside of the area to be reproduced being:

$$1/(r_{max} * r_{max}) * r^2,$$

and a weighting for dynamic range control of the image data which is in the area to be reproduced being:

$$1 - 1/(r_{max} * r_{max}) * r^2,$$

where r denotes a distance to a center of the image data.

2. The image reproducing apparatus of claim 1, wherein the dynamic range control unit acquires pixel data of an image area to be displayed from the high dynamic range image data, and performs the dynamic range control using the acquired pixel data.

3. The image producing apparatus of claim 1, wherein when the selected display mode is a zoom and scroll display mode, and if a pixel data size of a selected area of the image to be zoomed is greater than an available pixel data size of the display, the dynamic range control unit thins out pixels from the selected area of the high dynamic range image data to be zoomed and performs the dynamic range control using the thinned-out pixel data, and if the pixel data size of the selected area of the image to be zoomed is less than or equal to the available pixel data size of the display, then the dynamic range control unit performs the dynamic range control using the selected area of the high dynamic range image data without thinning out.

4. The image reproducing apparatus of claim 1, wherein if a zoom and scroll display mode is selected, the dynamic range control unit acquires pixel data in an image area to be displayed, together with additional pixel data surrounding the image area to be displayed, from the high dynamic range image data, and applies a weighting factor to the acquired pixel data during the dynamic range control so as to allow luminance of a displayed image to vary smoothly.

5. The image reproducing apparatus of claim 1, wherein:
the dynamic range control unit is configured to control the dynamic range of the image to be reproduced according to an available pixel data size of the display,
the dynamic range control unit is configured to control thinning of the image to be reproduced according to the available pixel data size of the display, and
the display displays the thinned and dynamic range controlled image.

6. An image reproducing method comprising the steps of:
acquiring and storing high dynamic range image data;
reading out a portion of the high dynamic range image data;
selecting a display mode to be one of a full display mode, and a zoom and scroll display mode; and
performing dynamic range control on the read out image data by applying one of different types of dynamic range control schemes in accordance with the display mode which has been selected, wherein in the zoom and scroll display mode the dynamic range control is performed based on pixel data including pixel data of an area outside of an area to be reproduced, a weighting for dynamic range control of the image data is represented as a function of distance from a center of the image data such that a weighting for dynamic range control of the image data which is outside of the area to be reproduced being:

$$1/(r_{max}*r_{max})*r^2,$$

and a weighting for dynamic range control of the image data which is in the area to be reproduced being:

$$1-1/(r_{max}*r_{max})*r^2,$$

where r denotes a distance to a center of the image data.

7. The image reproducing method of claim 6, further comprising the steps of:
acquiring pixel data of an image area to be displayed from the high dynamic range image data; and
performing the dynamic range control using the selected pixel data.

8. The image producing method of claim 6, further comprising the steps of:
determining whether a zoom and scroll display mode is currently selected from the plurality of display modes;
if the zoom and scroll display mode is selected, then determining whether a pixel data size of a selected area of the image to be zoomed is greater than an available pixel data size of a display device;
if the pixel data size of the selected image area is greater than the available pixel data size of the display device, then thinning out pixels from the selected area of the high dynamic range image data to be zoomed; and
performing the dynamic range control using the thinned-out pixel data, when the pixel data size of the selected image area is greater than the available pixel data size of the display device.

9. The image producing method of claim 6, further comprising the steps of:
determining whether a zoom and scroll display mode is currently selected from the plural display modes;
if the zoom and scroll display mode is selected, then determining whether a pixel data size of a selected area of the image to be zoomed is greater than an available pixel data size of a display device;
if the pixel data size of the selected area of the image to be zoomed is less than or equal to the available pixel data size of the display, then performing the dynamic range control using the selected area of the high dynamic range image data without thinning out.

10. The image reproducing method of claim 6, further comprising of the steps of:
determining whether a zoom and scroll display mode is currently selected;
if the zoom and scroll display mode is selected, then acquiring pixel data in an image area to be displayed, together with additional pixel data surrounding the image area to be displayed, from the high dynamic range image data; and
applying a weighting factor to the acquired pixel data during the dynamic range control so as to allow luminance of a displayed image to vary smoothly.

11. The image reproducing method of claim 6, wherein:
the dynamic range of the image to be reproduced is controlled according to an available pixel data size of the display,
thinning of the image to be reproduced is controlled according to the available pixel data size of the display,
the method displaying the thinned and dynamic range controlled image.

* * * * *